(12) United States Patent
Mackay

(10) Patent No.: US 6,494,718 B1
(45) Date of Patent: Dec. 17, 2002

(54) THERAPEUTIC METHOD FOR CONFLICT RESOLUTION AND PRODUCT FOR USING SAME

(76) Inventor: Betty Alice Mackay, 4727 E. Hastings Street, Burnaby, British Columbia (CA), V6N 1A4

( * ) Notice: Subject to any disclaimer, the term of this patent is extended or adjusted under 35 U.S.C. 154(b) by 0 days.

(21) Appl. No.: 09/724,791

(22) Filed: Nov. 28, 2000

(51) Int. Cl.$^7$ .............................................. G09B 19/00
(52) U.S. Cl. ........................ 434/236; 434/237; 434/238
(58) Field of Search ................................ 434/236, 237, 434/238

(56) References Cited

U.S. PATENT DOCUMENTS

| | | | |
|---|---|---|---|
| 4,627,818 A | * 12/1986 | Von Fellenberg | 434/236 |
| 5,743,742 A | * 4/1998 | Morrel-Samuels | 434/236 |
| 5,795,155 A | * 8/1998 | Morrel-Samuels | 434/107 |
| 5,882,203 A | * 3/1999 | Correa et al. | 434/236 |
| 6,007,340 A | * 12/1999 | Morrel-Samuels | 434/236 |

OTHER PUBLICATIONS

"The Gestalt Two–Chair Technique: How It Relates to Theory". Doctoral Thesis by Betty Nichol Mackay, Apr. 1995 for the University of British Columbia.

* cited by examiner

*Primary Examiner*—John Edmund Rovnak
(74) *Attorney, Agent, or Firm*—John Russell Uren

(57) ABSTRACT

Method and product for increasing the awareness of one's self and for assessment and increasing decisiveness in conflict resolution in order to assist individuals who are conflicted by an intimate relationship. The method utilizes a plurality of individual statements which are each associated with one of four(4) different cells. The cells are positioned from lower to higher self awareness and decisiveness with conflict resolution being enhanced with statements falling within the cells of higher self awareness and decisiveness. Upon reviewing the individual statements and positioning such statements in appropriate locations on a template, the user becomes aware of his degree of decidedness and the quality of his decision and his level of awareness.

12 Claims, 9 Drawing Sheets

CONFLICT RESOLUTION (A)

| | | UNRESOLVED (A$_1$) | RESOLVED (A$_2$) |
|---|---|---|---|
| CONTACT (B) | INTERRUPTION OF CONTACT (B$_1$) | A$_1$B$_1$<br>CELL 1<br>STAGE 1<br>OPPOSITION (P)<br>*101* | A$_2$B$_1$<br>CELL 3<br>STAGE 1<br>OPPOSITION (O)<br>*103* |
| | IN CONTACT (B$_2$) | A$_1$B$_2$<br>CELL 2<br>STAGE 1<br>OPPOSITION (Y)<br>*102* | A$_2$B$_2$   *110*<br>CELL 4<br>STAGE 2<br>MERGING (B)<br>STAGE INTEGRATION<br>*111* |

*104*

CONFLICT RESOLUTION (A)

| | UNRESOLVED (A₁) | RESOLVED (A₂) |
|---|---|---|
| INTERRUPTION OF CONTACT (B₁) | A₁B₁<br>CELL 1<br><br>STAGE 1<br>OPPOSITION (P)<br>_101_ | A₂B₁<br>CELL 3<br><br>STAGE 1<br>OPPOSITION (O)<br>_103_ |
| IN CONTACT (B₂) | A₁B₂<br>CELL 2<br><br>STAGE 1<br>OPPOSITION (Y)<br>_102_ | A₂B₂  _110_<br>CELL 4<br><br>STAGE 2<br>MERGING (B)<br><br>STAGE<br>INTEGRATION<br>_111_ |

CONTACT (B) (row label)

CELL 1 - UNDECIDED AND OUT OF CONTACT

1. I don't know what to do.
2. I'm confused.
3. I'm frustrated.
4. I constantly question myself.
5. I don't know what I feel anymore.
6. I don't like the person I've become.
7. I feel like life is passing me by.
8. I feel anxious a lot of the time.
9. I feel discouraged.
10. I'm depressed.
11. I'm just not happy.
12. I feel like something is wrong with me.
13. Sometimes I think I'm going crazy.
14. My emotions are on hold.
15. Sometimes I feel suicidal.
16. I feel out of control.
17. I feel like running away.
18. I feel like a failure.
19. I'm afraid I (or my partner) is going to lose it.
20. I'm afraid.
21. I don't know what I want and need.
22. I feel cut off from my partner.
23. I feel stuck.
24. I feel trapped.
25. I feel overwhelmed.

FIG. 3A

Cell 2 - Undecided and In contact

26. I hold myself back from loving my partner.
27. I won't let myself accept my partner's love.
28. I sabotage myself.
29. I stop myself from breaking up the family.
30. I see clearly both sides of my dilemma.
31. I put myself down.
32. I should count my blessings, others are worse off.
33. I'm really hard on myself.
34. I demand a lot of myself.
35. I feel pressure to honor my (wedding vows) commitment.
36. I should be different than I am.
37. What I want conflicts with what I think I should do.
38. I feel guilty if I do what I want.
39. I feel stifled by my standards and values.
40. I hold myself back from taking action to solve my problem.
41. I won't let myself trust my partner.
42. I am struggling hard to resolve my conflict.
43. I pressure myself to do what I think I should do.
44. I want a better relationship.
45. I want a better life for myself.
46. I want a better life for my children.
47. I want to be free.
48. I want (more) children.
49. I want someone to love me.
50. I want someone to love.
51. I want a better sexual relationship.

FIG. 3B

Cell 3 - Decided and Out of Contact

52. I'll stay/leave to get my sexual needs met.
53. I'm too paralyzed to do anything.
54. I've decided to give up trying to get what I want and need.
55. I feel utterly hopeless that I can change my situation.
56. The bond I feel with my partner is too strong to break.
57. I've decided to remain undecided.
58. I've decided to settle for what I've got.
59. I've decided that I have no choice.
60. I've decided to sacrifice myself for my (marriage) relationship.
61. I'll stay because I don't want to hurt anyone.
62. I'll continue as I am because I don't like change.
63. Because I don't know what else to do, I'll just leave things as they are.
64. I'll stay because I don't want to be alone.
65. I'll stay/leave for the children's sake.
66. I'll stay with the hope that my partner will change.
67. The price I'll pay is too high if I stay/leave.
68. Financially I can't afford to stay/leave.
69. I can't face starting over.
70. I'll stay because I'll feel too guilty if I leave.
71. I value being (married) in a relationship too much to leave.
72. I've decided to lead a separate life within the (marriage) relationship.
73. My fear, that I won't survive on my own forces me to stay.
74. I'll stay/leave because of my parents (or my partner's parents).
75. I'll stay/leave because I no longer trust my judgment.
76. I'm too worried about what other people will think to stay/leave.

FIG. 3C

CELL4A - DECIDED AND IN CONTACT

77. What I want and need is too important to give up.
78. My deeper feelings are clear to me.
79. I realize my self-criticisms are based on my fears.
80. I realize that I'm a better person than I thought I was.
81. I can ease up on myself.
82. What I want and need is worth fighting for.
83. What I feel is important.
84. I feel very tender towards myself.
85. I realize I'm not a bad person, just scared.
86. I feel very protective toward myself.
87. I can accept myself as I am.
88. I'm not as messed up as I thought I was.

CELL4B - DECIDED AND IN CONTACT

89. I have wants and needs that stem from a new sense of myself.
90. I have new sensations and feelings that I feel good about.
91. I trust myself.
92. I feel good about the decision I've come to.
93. I can make a difference in my life.
94. I value myself.
95. I believe that whatever I do I'm going to be OK.
96. It's OK for me to do what is right for me.
97. I can reconcile the differences within myself.
98. I've decided to take care of myself.
99. I feel at peace with myself.
100. I feel relief.
101. I see things in a new way.

Page 1/5 — Nov 26, 00 1:05 — bsort.vb

```vb
' VB implementation of the B-Sort
'
' Angus Mackay

Const NUMCOLORS = 5

Const COLORPINK As Integer = 0
Const COLORRED As Integer = 1
Const COLORYELLOW As Integer = 2
Const COLORBLUE As Integer = 3
Const COLORGREEN As Integer = 4

Const MINCARDNUMBER As Integer = 1
Const MAXCARDNUMBER As Integer = 101
Const NUMCARDS As Integer = 101

Const PINKTHRESH As Integer = 1
Const YELLOWTHRESH As Integer = 26
Const REDTHRESH As Integer = 52
Const BLUETHRESH As Integer = 77
Const GREENTHRESH As Integer = 89

Const QoDcoeffA As Double = 0.5
Const QoDcoeffB As Double = 1.5
Const QoDcoeffC As Double = 1.4
Const QoDcoeffD As Double = 1.2
Const QoDcoeffE As Double = 0.6
Const QoDcoeffF As Double = 1.4
Const QoDcoeffG As Double = 1.4

Const DoDcoeffA As Double = 2.0
Const DoDcoeffB As Double = 1.0
Const DoDcoeffC As Double = 2.0
Const DoDcoeffD As Double = 1.0
Const DoDcoeffE As Double = 3.0
Const DoDcoeffF As Double = 1.0
Const DoDcoeffG As Double = 1.0

Const AoScoeffA As Double = 0.8
Const AoScoeffB As Double = 2.0
Const AoScoeffC As Double = 2.0
Const AoScoeffD As Double = 1.0
Const AoScoeffE As Double = 0.9

' used to fudge to a 1 -> 10 rating
Const QoDMax As Double = 210
Const QoDMin As Double = -460
Const DoDMax As Double = 390
Const DoDMin As Double = -255
Const AoSMax As Double = 380
Const AoSMin As Double = -80

' the row and column that the data starts in
Const STARTCOL As Integer = 2
Const STARTROW As Integer = 6

' the rating of every card
Dim cardRatings(NUMCARDS) As Integer

' like and not-like scores for all colors
Dim scoreLike(NUMCOLORS) As Integer
Dim scoreNotLike(NUMCOLORS) As Integer

'==========================================

Function ColorWeight(numOffCenter)
    ColorWeight = 4 + 2 * numOffCenter
```

Page 2/5 — Nov 26, 00 1:05 — bsort.vb

```vb
End Function

Function ColorIndex(cardNumber)
    If cardNumber < MINCARDNUMBER Then
        MsgBox("Error cell value is not between " & MINCARDNUMBER & " and " & MA
XCARDNUMBER)
    End
    ElseIf cardNumber > MAXCARDNUMBER Then
        MsgBox("Error cell value is not between " & MINCARDNUMBER & " and " & MA
XCARDNUMBER)
    End
    ElseIf cardNumber < YELLOWTHRESH Then
        ColorIndex = COLORPINK
    ElseIf cardNumber < REDTHRESH Then
        ColorIndex = COLORYELLOW
    ElseIf cardNumber < BLUETHRESH Then
        ColorIndex = COLORRED
    ElseIf cardNumber < GREENTHRESH Then
        ColorIndex = COLORBLUE
    Else
        ColorIndex = COLORGREEN
    End If
End Function Sub ColorCell(row As Integer, col As Integer, cardNumber As Integer)
Dim color As Integer color = ColorIndex(cardNumber)

If color = COLORPINK Then
        Worksheets(1).Cells(row, col).Cells.interior.color = RGB(255, 150, 255)
    ElseIf color = COLORYELLOW Then
        Worksheets(1).Cells(row, col).Cells.interior.color = RGB(255, 255, 150)
    ElseIf color = COLORRED Then
        Worksheets(1).Cells(row, col).Cells.interior.color = RGB(255, 0, 0)
    ElseIf color = COLORBLUE Then
        Worksheets(1).Cells(row, col).Cells.interior.color = RGB(100, 200, 255)
    ElseIf color = COLORGREEN Then
        Worksheets(1).Cells(row, col).Cells.interior.color = RGB(200, 255, 200)
    End If
End Sub Function CalcCardRating(row As Integer, col As Integer, colorCells As Boolean)
sign As Integer, numOffCenter As Integer
Dim cellValue As Integer cellValue = Worksheets(1).Cells(row, col).Value If cellValue < MINCARDNUMBER Then
        MsgBox("Error cell value is not between " & MINCARDNUMBER & " and " & MA
XCARDNUMBER)
    End
    ElseIf cellValue > MAXCARDNUMBER Then
        MsgBox("Error cell value is not between " & MINCARDNUMBER & " and " & MA
XCARDNUMBER)
    End
    End If If cardRatings(cellValue - 1) <> 0 Then
        MsgBox("WARNING: duplicate entry for card " & cellValue)
    End If
    If sign > 0 Then
        cardRatings(cellValue - 1) = ColorWeight(numOffCenter)
    Else
        cardRatings(cellValue - 1) = -ColorWeight(numOffCenter)
    End If
    If colorCells Then
        ColorCell row, col, cellValue
    EndIf
```

FIG. 4B

Page 3/5 — bsort.vb (Nov 26, 00 1:05)

```vb
End Function

Sub CalcCardRatings(colorCells As Boolean)
    Dim counter As Integer

' init the card ratings array to 0
    For counter = 1 To NUMCARDS
        cardRatings(counter-1) = 0
    Next counter ' how far off the center we are
    Dim numOffCenter As Integer Dim colOffset As Integer ' * calculate all the like scores * colOffset = 0
    numOffCenter = 4
    For counter = 0 To 1
        CalcCardRating STARTROW+counter, STARTCOL+colOffset, numOffCenter, +1, colorCells
    Next counter
    colOffset = colOffset + 1
    numOffCenter = numOffCenter - 1
    For counter = 0 To 2
        CalcCardRating STARTROW+counter, STARTCOL+colOffset, numOffCenter, +1, colorCells
    Next counter
    colOffset = colOffset + 1
    numOffCenter = numOffCenter - 1
    For counter = 0 To 5
        CalcCardRating STARTROW+counter, STARTCOL+colOffset, numOffCenter, +1, colorCells
    Next counter
    colOffset = colOffset + 1
    numOffCenter = numOffCenter - 1
    For counter = 0 To 8
        CalcCardRating STARTROW+counter, STARTCOL+colOffset, numOffCenter, +1, colorCells
    Next counter
    colOffset = colOffset + 1
    numOffCenter = numOffCenter - 1
    For counter = 0 To 11
        CalcCardRating STARTROW+counter, STARTCOL+colOffset, numOffCenter, +1, colorCells
    Next counter ' * calculate all the not-like scores * colOffset = 10
    numOffCenter = 4
    For counter = 0 To 1
        CalcCardRating STARTROW+counter, STARTCOL+colOffset, numOffCenter, -1, colorCells
    Next counter
    colOffset = colOffset - 1
    numOffCenter = numOffCenter - 1
    For counter = 0 To 2
        CalcCardRating STARTROW+counter, STARTCOL+colOffset, numOffCenter, -1, colorCells
    Next counter
    colOffset = colOffset - 1
    numOffCenter = numOffCenter - 1
    For counter = 0 To 5
        CalcCardRating STARTROW+counter, STARTCOL+colOffset, numOffCenter, -1, colorCells
    Next counter
```

Page 4/5 — bsort.vb (Nov 26, 00 1:05)

```vb
    Next counter
    colOffset = colOffset - 1
    numOffCenter = numOffCenter - 1
    For counter = 0 To 8
        CalcCardRating STARTROW+counter, STARTCOL+colOffset, numOffCenter, -1, colorCells
    Next counter
    colOffset = colOffset - 1
    numOffCenter = numOffCenter - 1
    For counter = 0 To 11
        CalcCardRating STARTROW+counter, STARTCOL+colOffset, numOffCenter, -1, colorCells
    Next counter End Sub Sub ColorCells()
    CalcCardRatings(True)
End Sub Function CalcColorRatings()
    Dim counter As Integer For counter = 1 To NUMCOLORS
        scoreLike(counter-1) = 0
        scoreNotLike(counter-1) = 0
    Next counter ' do the ratings for the cards
    CalcCardRatings(False)

For counter = 1 To NUMCARDS
        If cardRatings(counter-1) > 0 Then
            scoreLike(ColorIndex(counter)) = scoreLike(ColorIndex(counter)) + cardRatings(counter-1)
        Else
            scoreNotLike(ColorIndex(counter)) = scoreNotLike(ColorIndex(counter)) - cardRatings(counter-1)
        End If
    Next counter Debug.Print "Pink: " & scoreLike(COLORPINK) & Chr(10) & "Yellow: " & scoreLike(COLORYELLOW) & Chr(10) & "Red: " & scoreLike(COLORRED) & Chr(10) & "Blue: " & scoreLike(COLORBLUE) & Chr(10) & "Green: " & scoreLike(COLORGREEN)

Debug.Print "Pink: " & scoreNotLike(COLORPINK) & Chr(10) & "Yellow: " & scoreNotLike(COLORYELLOW) & Chr(10) & "Red: " & scoreNotLike(COLORRED) & Chr(10) & "Blue: " & scoreNotLike(COLORBLUE) & Chr(10) & "Green: " & scoreNotLike(COLORGREEN)

End Function

Sub CalculateRatings()
    Dim QoD As Double
    QoD = 0.0
    Dim DoD As Double
    DoD = 0.0
    Dim AoS As Double
    AoS = 0.0

Debug.Print Chr(10) & "=== starting new run ==="

' figure out the ratings for all the colors
    CalcColorRatings

' find the QoD
    QoD = QoD + (scoreLike(COLORYELLOW) - scoreNotLike(COLORYELLOW)) * QoDcoeffA
    QoD = QoD + (scoreLike(COLORBLUE) - scoreNotLike(COLORBLUE)) * QoDcoeffB
```

FIG. 4B

```
QoD = QoD + (scoreLike(COLORGREEN) - scoreNotLike(COLORGREEN)) * QoDcoeffC
QoD = QoD + (scoreLike(COLORRED)) * QoDcoeffD
QoD = QoD - (scoreLike(COLORPINK)) * QoDcoeffE
QoD = QoD + (cardRatings(92-1)) * QoDcoeffF
QoD = QoD + (cardRatings(99-1)) * QoDcoeffG ' find the DoD
DoD = DoD + (scoreLike(COLORBLUE)) * DoDcoeffA
DoD = DoD - (scoreNotLike(COLORBLUE)) * DoDcoeffB
DoD = DoD + (scoreLike(COLORGREEN)) * DoDcoeffC
DoD = DoD - (scoreNotLike(COLORGREEN)) * DoDcoeffD
DoD = DoD + (scoreLike(COLORRED)) * DoDcoeffE
DoD = DoD - (scoreLike(COLORPINK)) * DoDcoeffF
If cardRatings(100-1) > 0 Then
    DoD = DoD + cardRatings(100-1) * DoDcoeffG
End If ' find the AoS
AoS = AoS + (scoreLike(COLORYELLOW)) * AoScoeffA
AoS = AoS + (scoreLike(COLORBLUE)) * AoScoeffB
AoS = AoS + (scoreLike(COLORGREEN)) * AoScoeffC
AoS = AoS + (scoreLike(COLORRED)) * AoScoeffD
AoS = AoS - (scoreLike(COLORPINK)) * AoScoeffE ' fit to 1 -> 10
Dim QoDscore As Double
Dim DoDscore As Double
Dim AoSscore As Double
If QoD >= 0 Then
    QoDscore = 5 + 5 * (QoD/QoDMax)
Else
    QoDscore = 5 - 4 * (QoD/QoDMin)
End If
If DoD >= 0 Then
    DoDscore = 5 + 5 * (DoD/DoDMax)
Else
    DoDscore = 5 - 4 * (DoD/DoDMin)
End If
If AoS >= 0 Then
    AoSscore = 5 + 5 * (AoS/AoSMax)
Else
    AoSscore = 5 - 4 * (AoS/AoSMin)
End If Debug.Print "QoD: " & Format(QoDscore, "0.00")
Debug.Print "DoD: " & Format(DoDscore, "0.00")
Debug.Print "AoS: " & Format(AoSscore, "0.00")

Debug.Print Format(QoDscore, "0.00")
Debug.Print Format(DoDscore, "0.00")
Debug.Print Format(AoSscore, "0.00")

MsgBox("B-Sort Results:" & Chr(10) & "QoD: " & Format(QoDscore, "0.00") & " " _
    & QoD & ")" & Chr(10) & "DoD: " & Format(DoDscore, "0.00") & " (" & DoD & ")" _
    & Chr(10) & "AoS: " & Format(AoSscore, "0.00") & " (" & AoS & ")" & Chr(10))

End Sub
```

FIG. 4C

THERAPEUTIC METHOD FOR CONFLICT RESOLUTION AND PRODUCT FOR USING SAME

This invention relates to a decision making technique and, more particularly, to a decision making technique specifically designed for assisting individuals who are conflicted in an intimate relationship to resolve such conflicts in a satisfactory manner within one's self. This invention also relates to computer and interactive use of the method according to the invention.

BACKGROUND OF THE INVENTION

It is often the case that conflicts arise within individuals and cause stress to such individuals. Presumably, allowing an individual to resolve such conflicts in a satisfactory manner will reduce the stress on the individual and allow the individual to continue life in a more stable mind set thus contributing to the well being, happiness or satisfaction of the individual.

Conflicts arise in relationships over which the individual has no personal control. First, there may be conflicts due to the perception by an individual of his perception by others. Such conflicts are clearly not within the control of the individual and therefor are not resolvable by that individual. However, if the individual can recognize that such conflicts are not within the individual's control, it will presumably assist the individual to attach less importance to such uncontrollable conflicts. Second, there may be conflicts which are quite within the control of the individual. If the individual recognizes that such conflicts, known as intra psychic conflicts, are within the control of the individual, the individual can proceed to resolve these controllable conflicts and spend the necessary time in doing so since the time used will be spent in a productive manner.

In addition to recognizing that intra psychic conflicts may be resolved by the individual because they are within the control of the individual, conflicts are present that the individual may think have been resolved but which have been resolved for incorrect reasons. The supposition present is that the individual may have resolved those conflicts by dependence on the actions of others which are not controllable by the individual. It would be beneficial if the individual could recognize that he has made decisions and that the decisions made have not resolved the conflict appropriately.

The theory of conflict resolution using the Two Chair Technique was disclosed by the inventor in her Ph. D. thesis entitled *The Gestalt Two-Chair Technique: How It Relates to Theory*, the University of British Columbia, 1995. That conflict resolution, however, did not teach or contemplate the ability to put the theory into practise by way of concrete and specific steps that could be taken by either joint individuals, namely a mentor and the conflicted individual. Nor did it contemplate that an individual could participate on a private and personal basis without the presence of a mentor or professional.

One problem with therapeutic counselling is embarrassment by the conflicted individual. Regardless of whether or not the mentor or professional is known to the individual or not, the conflicted individual is often reluctant to discuss private or personal lifestyle details with the mentor. Privacy is a key requirement to avoid embarrassment and the perception of individuals may be that such privacy is not forthcoming when a third party is involved, even if the third party is not known to the individual. A further problem relates to the availability of professional help for the individual. It may be that professional assistance is too expensive or is otherwise unavailable.

SUMMARY OF THE INVENTION

According to one aspect of the invention, there is disclosed a product for assessing and resolving intra psychic conflict and increasing self-awareness in an individual arising from an intimate relationship with another party comprising a plurality of individual statements, each of said statements falling within a predetermined cell, each respective statement being associated with said predetermined cell by one of four (4) criteria, the first one of said four(4) criteria being a lack of awareness of one's self and a state of indecision, the second one of said four(4) criteria being an awareness of ones's self and a state of indecision, the third one of said four(4) criteria being lack of awareness of one's self and a state of decidedness and the fourth one of said four(4) criteria being an awareness of one's self and a state of decidedness.

According to a further aspect of the invention, there is provided a method for assessment and resolutiion of intra psychic conflict and increasing self-awareness within a first individual arising from an intimate relationship with a second individual, said method comprising providing said first individual with a plurality of individual statements, each of said statements being associated with one of a plurality of four(4) cells, said first one of said four(4) cells requiring a statement constructed to reveal a lack of awareness of one's self and a state of indecision, said second one of said four(4) cells requiring a statement constructed to reveal an awareness of ones's self and a state of indecision, said third one of said four(4) cells requiring a statement constructed to reveal a lack of awareness of one's self and a state of decidedness and said fourth one of said four(4) cells requiring a statement constructed to reveal an awareness of one's self and a state of decidedness.

BRIEF DESCRIPTION OF THE SEVERAL VIEWS OF THE DRAWINGS

Specific embodiments of the invention will now be described, by way of example only, with the use of drawings in which:

FIG. 1 is a diagrammatic view of the four(4) cells within which each of the statements is intended to fall;

FIGS. 3A, 3B, 3C and 3D set out each of the statements, provides a number for each statement and associates each of the statements with one of the cells; and FIGS. 4A, 4B and 4C disclose a source code used for obtaining individual scores according to a further aspect of the invention.

DESCRIPTION OF SPECIFIC EMBODIMENT

Figure 2:
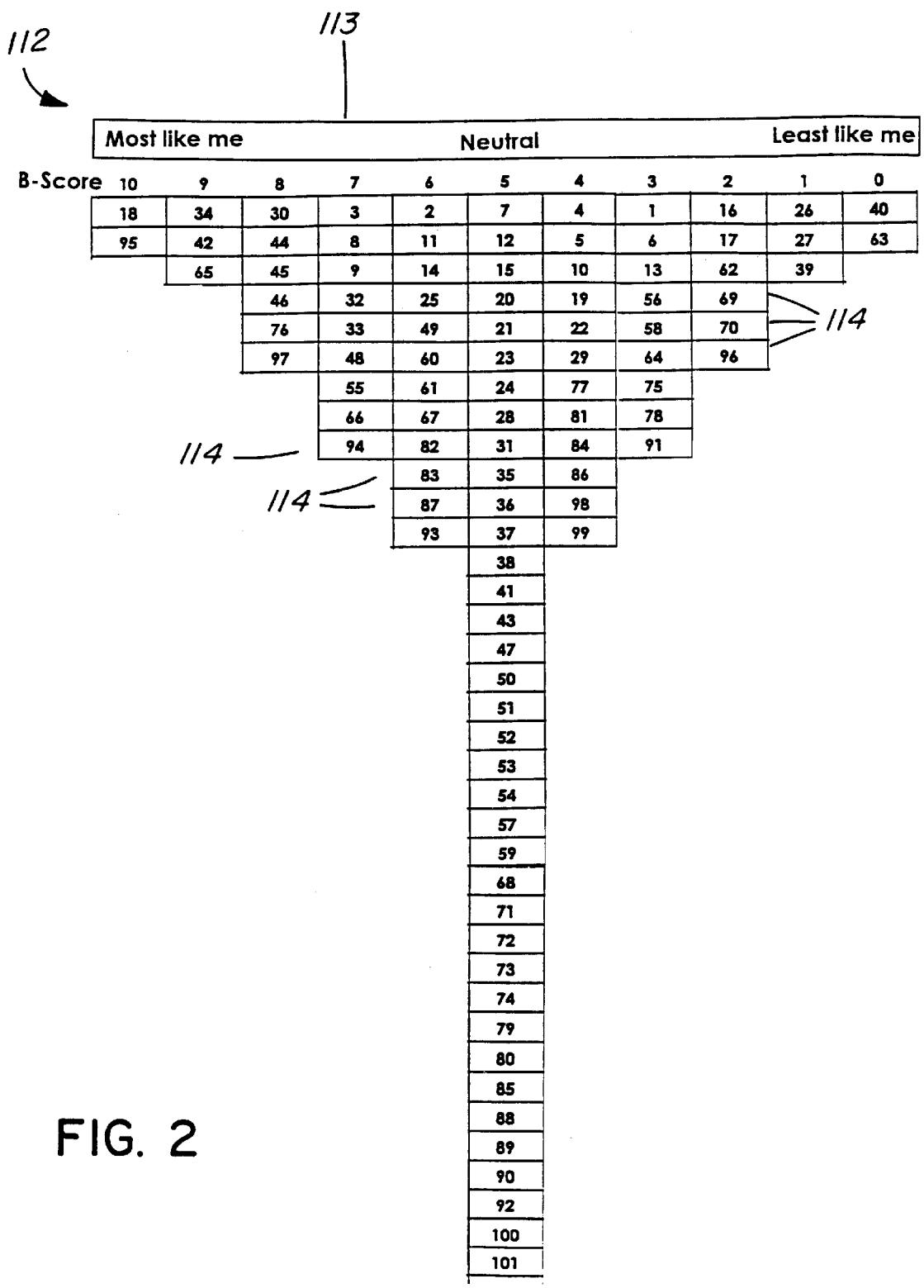
FIG. 2 is a typical response originating from a user who has reviewed the plurality of statements and placed them on a template.

Referring now to the drawings, the conflict resolution and self awareness technology according to the invention is intended to assist individuals in assessing and resolving intra psychic conflicts which arise within an intimate relationship with another individual. To this end, a plurality of statements are originated as set out in FIG. 3 for consideration by the first conflicted individual. Each of the statements within FIG. 3 is intended to fall within one of four(4) cells as illustrated in FIG. 1, namely Cell1 generally illustrated at 101, Cell2 generally illustrated at 102, Cell3 generally illustrated at 103 and Cell4 generally illustrated at 104. Cell4 104 is further divided into two(2) sectors, first sector 110 also known as the merger sector and second sector 111 also known as the integration sector, as will be described. The statements falling within Cell4 104 further fall within either the merger sector 110 or the integration sector 111.

The statements are all set forth in FIG. 3. Each statement is operably printed on an individual card. There are one-hundred-one(101) statements and, accordingly, 101 printed cards. The number of cards which are usable are reduced during operation as will be described.

In originating each of the statements in FIG. 3, it is intended that each statement fall within one of the four(4) cells of FIG. 1. Two(2) considerations are relevant in forming each statement. Those two considerations are factors which are identified as conflict resolution and contact or, as stated otherwise, an awareness of one's self. The conflict resolution factor is further divided into conflicts that are unresolved by the individual and conflicts that have been or are resolved by the individual. The contact or awareness of one's self factor is likewise divided into that of awareness of one's self and lack of awareness of one's self.

This gives us the four(4) cells set out above, namely Cell1 101, Cell2 102, Cell3 103 and Cell4 104. Dealing first with Cell1 101, a statement is designed to fall within Cell1 101 if the statement conveys a combination of a lack of awareness of one's self and a state of indecision of the part of the individual. Dealing with Cell2 102, a statement is designed to fall within Cell2 102 if the statement conveys a combination of an awareness of one's self and a state of indecision. Dealing with Cell3 103, a statement is designed to fall within Cell3 103 if the statement conveys a combination of a lack of awareness of one's self and a state of decidedness. Dealing with Cell4 104, a statement is designed to fall within Cell4 104 if the statement conveys a combination of an awareness of one's self and a state of decidedness. Finally, the Cell4 104 statements are divided into sectors 110, 111, as described. The sector 110 statements are designed to know whether the user has made the necessary inner adjustment, alternatively known as merging, or whether the user has obtained the preferred resolution into sector 111; namely that of integration, resolution of the conflict with an awareness of one's self.

The statements intended to fall within Cell1 101 are given in FIG. 3 and are numbered from 1 to 25. The statements intended to fall within Cell2 102 are numbered 26 to 51. The statements intended to fall within Cell3 103 are numbered from 52 to 76. The statements intended to fall within Cell4 104, sector 110 are numbered 77 to 88 and, finally, the statements intended to fall within Cell4 104, sector 111 are given in FIG. 3 and are numbered 89 to 101.

There are guides for deriving the statements for each cell. For the statements intended to fall within Cell1 101, the attempt is to prepare statements that convey both a lack of awareness of one's self and a lack of decision regarding the intimate relationship. Such statements are intended to focus on the intra psychic conflict within the individual rather than any consideration of the second party in the relationship.

For statements intended to fall within Cell2 102, the attempt is to prepare statements that show an awareness of one's self and of the inner conflict within one's self but that the individual is still undecided about any resolution of the conflict.

For statements intended to fall within Cell3 103, the attempt is to prepare statements that show a lack of awareness of one's inner self but that a decision has been made by the individual in respect of the conflict within the individual. For statements intended to fall within Cell4 104, sector 110, the attempt is to prepare statements that show a shifting from harshness toward one's inner self to a more understanding or softening attitude towards one's self. This process is known as merging and, when the softening attitude is present, integration is said to occur. For statements intended to fall within Cell4 104, sector 111, the statements are intended to show a satisfaction with one's self in a sympathetic or softening manner and a unitary sense of self with no conflict present.

A template 112 is provided to the user by the mentor, the template being shown generally at 112 in FIG. 2. The upper "Most Like Me-Least Like Me" line 113 ranges from the criterion "Most Like Me" in which a score of 10 is assigned, to a neutral criterion in which a score of 5 is assigned, to the criterion "Least Like Me" in which a score of zero is assigned. There is a statistical distribution of boxes 114 which correlate to the number of cards being read by the user which cards carry the statements of FIG. 3 as described. Each of the cards will be read by the user and placed on the template 112 in the appropriate one of the boxes 114. Each one of the cards has a number appearing on the back of the card which number will assign the statement to one of the four cells 101, 102, 103, 104. Following the distribution of the cards and their placement on the boxes 114 of the template 112, the back of the cards are reviewed so that a distribution of the cells 101, 102, 103, 104 is obtained from the placement of each of the cards within the boxes 114.

Operation

In operation, all of the statements given in FIG. 3 are given to the user. Each of the statements are printed on an individual card. The opposite side of each card carries a card number. The card number is provided so as to give information on the association between the individual card and the respective cell to which it belongs.

One-hundred one(101) cards are originally provided to the user. However, the user will discard or remove certain cards upon review which cards are irrelevant or inapplicable to the individual. It is intended that the user will end up with sixty-four(64) cards correlating to sixty-four(64) boxes 114 on the template 112 of FIG. 2. The user will read each statement on each card. The user will then place the card in the appropriate box 114 on the template 112 of FIG. 2.

The process continues until each of the sixty-four(64) cards are in position within the boxes 114 of the template 112.

The mentor will then make note of the card numbers on the rearward sides of the cards and will correlate the position of the cards on the template 112 with a desired or preferred location of the cards if the user has reached a sympathetic awareness of one's self with generally resolved conflicts as represented by Cell4 104, sector 111 (FIG. 1). Clearly the greater number of cards falling within Cell4 104, sector 111, that appear on the left side of the template 112 as illustrated in FIG. 2, will be preferred for the user since such a configuration will reveal a sympathetic awareness of one's self and a satisfactory resolution of the intra psychic conflicts arising from the relationship causing concern to the user. Scores can be appropriately awarded with a higher score for a greater number of Cell 4 104 cards being on the lefthand side of template 112 and a lower score for a fewer number of Cell4 104 cards being on the lefthand side of template 112. By reference to the score given to the user and/or by reference to the placement of the specific cards, the mentor can facilitate development in the individual of a new awareness of the intra psychic conflict. The objective of the exercise is to give the individual an awareness of the individuals current degree of decidedness, the user's degree of awareness of the self and the quality of the decision made with regard to the intra psychic conflict.

It is further contemplated that specific statements could be provided on cards that would provide flags for feelings on behalf of the user which are particularly troubling such as depression or suicidal thoughts. If such flags were placed in a position to the left of the template 112 of FIG. 2, the user could be closely monitored or controlled to ensure that satisfactory or specific treatment could be recommended for such an individual.

While the above-identified process for conflict resolution has been described by way of personal interaction between a mentor and a client, it is clear that the method would also lend itself to individual manipulation without the presence of a mentor such as interaction between a user and a URL or website wherein the card positioning process would be monitored by a central processing unit and the individual statements could be given to the user by way of a computer monitor.

For example, the method could be placed at a website accessed by users by way of identification numbers, passwords and the like. Upon appropriate sign in, a written instruction screen would provide instructions to the user. Thereafter, for example, each of the statements could be flashed to the user as in playing solitaire where the cards are manipulated with the use of a mouse. The user could discard those irrelevant or inapplicable statements and place the remaining appropriate and applicable statements in the appropriate location on a template 112 which would also be shown on the monitor. It may be appropriate for certain purposes, such as a quick analysis tool used by a mentor for example, to give the cards a color corresponding to the cell within which the statement on the card would fall. The colors could quickly lead to an analysis by an experienced mentor.

When the template distribution illustrated in FIG. 2 is obtained, a weighting of the placement of the cards within the boxes 114 of the template 112 may be provided. This weighting would include not only a value depending on the cell within which the statement falls but also a weighting factor that would increase or decrease dependent upon the position of the statement on the template 112 from the null or central position. Such weighting may be accomplished through experience by the mentor with many different users.

By such weighting, three(3) scores are contemplated as being provided to the user. These scores, for example, would be scores covering the Quality of Decision (QoD), the Degree of Decidedness (DoD) and the Awareness of Self (AoS). The source code included as FIG. 4 may be used to calculate the three(3) scores with the inputting to the source code including an identification of the card or statement location on the template 112 of FIG. 3 and its association with one of the relevant cells.

It is further contemplated that rather than inputting data from a completed template, the software could be further developed to allow interactive inputting by a user which allows real time card review and card placement on the template by the user. Such a card placement would then immediately display scores to be displayed as described.

In addition to interactive communication between a user and a personal computer or website, it is further contemplated that the software could be packaged and sold or licensed to professional mentors for use in their practises with their clients. The software would be very similar to that used with the interactive non-professional user as described. However, the software provided to professional mentors could include additional features which would explain the therapies following initial client assessment which therapies would depend on card placements on the template 112.

Many modifications will readily occur to those skilled in the art to which the invention relates and the specific embodiments herein described should be taken as illustrative of the invention only and not as limiting its scope as defined in accordance with the accompanying claims.

I claim:

1. A product for assessing and resolving intra psychic conflict and increasing self-awareness of an individual arising from an intimate relationship with another party comprising a plurality of readable individual statements, each of said readable statements falling within a predetermined cell, each of said respective readable statements being associated with said predetermined cell by one of four(4) criteria, the first one of said four(4) criteria being a lack of awareness of one's self and a state of indecision, the second one of said four(4) criteria being an awareness of ones's self and a state of indecision, the third one of said four(4) criteria being lack of awareness of one's self and a state of decidedness and the fourth one of said four(4) criteria being an awareness of one's self and a state of decidedness.

2. Product as in claim 1 wherein said fourth one of said four(4) criteria is further divided into two further sectors, said first one of said two further sectors being a merger sector and said second one of said two further sectors being an integration sector.

3. Product as in claim 2 wherein said product is a set of instructions existing on a computer readable medium.

4. Product as in claim 3 wherein said set of instructions is loaded on a computer at least partially at a location remotely from said individual.

5. Product as in claim 4 wherein said set of instructions is loaded on a personal computer.

6. Product as in claim 4 wherein said remote location is a website.

7. Product as in claim 4 wherein said individual has interactive access to said website.

8. Product as in claim 5 wherein said set of instructions is used interactively by said individual at said personal computer.

9. A method for assessing and resolving intra psychic conflict and increasing self-awareness within a first individual arising from an intimate relationship with a second individual, said method comprising providing said first individual with a plurality of individual statements, each of said statements being associated with one of a plurality of four(4) cells, said first one of said four(4) cells requiring a statement constructed to reveal a lack of awareness of one's self and a state of indecision, said second one of said four(4) cells requiring a statement constructed to reveal an awareness of ones's self and a state of indecision, said third one of said four(4) cells requiring a statement constructed to reveal a lack of awareness of one's self and a state of decidedness and said fourth one of said four(4) cells requiring a statement constructed to reveal an awareness of one's self and a state of decidedness.

10. Method as in claim 9 wherein said method is installed on software and said first individual practises said method interactively with said software.

11. Method as in claim 10 wherein said software is located remotely from said first individual at a website.

12. Method as in claim 10 wherein said software is located on a personal computer and said interactive practise occurs between said first individual and said personal computer.

* * * * *